March 30, 1954  B. B. MINNIUM  2,673,972
CONDENSER
Filed Aug. 13, 1949

Inventor
Byron B. Minnium
By Ralph Hammar
Attorney

Patented Mar. 30, 1954

2,673,972

UNITED STATES PATENT OFFICE 2,673,972

CONDENSER

Byron B. Minnium, Erie, Pa., assignor to Erie Resistor Corporation, Erie, Pa., a corporation of Pennsylvania Application August 13, 1949, Serial No. 110,205

4 Claims. (Cl. 339—275)

This invention is intended to simplify the terminal connections for tubular ceramic condensers and the like by having the terminal lead wires within the bore of the tube and connected to the metallized electrodes by a diaphragm of solder bridging the end of the tube and overlapping the metallized coating on the outside of the tube. The soldering may be accomplished by dipping the end of the tube with the terminal lead in place into a solder pot. In the lowered position the solder fills the lower end of the tube. In a preferred form, as the tube is raised, a diaphragm of solder remains in the lower end of the tube and makes the connection to the lead wires and the periphery of the diaphragm overlaps the metallized coating on the outer surface of the tube and thereby provides a compression connection. Locating the terminals within the bore reduces the outside dimensions which is important in applications where space is at a premium. Further objects and advantages appear in the specification and claims.

Figure 1:
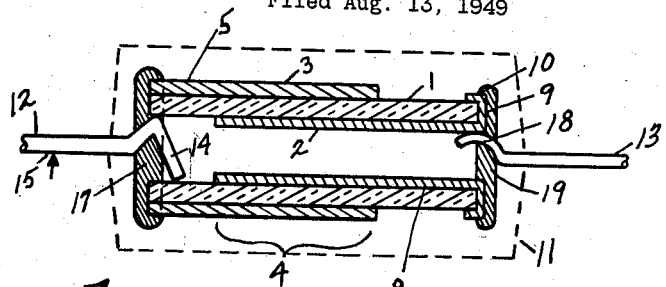
Figure 2:
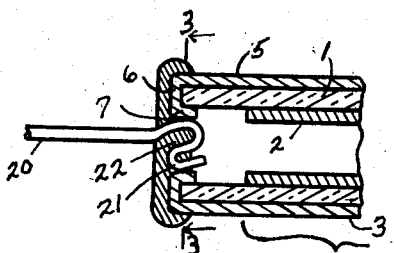
Figure 3:
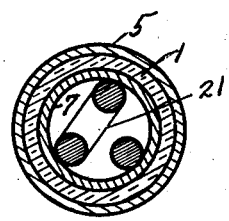
Figure 4:
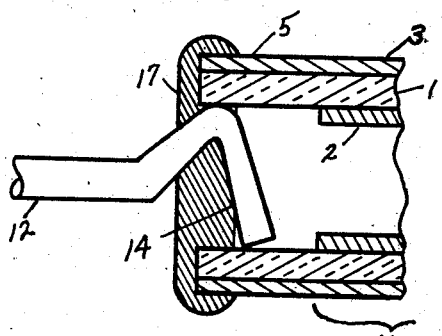

In the drawing, Fig. 1 is a section through a tubular ceramic condenser showing two forms of terminal connections; Fig. 2 is a fragmentary view of one end of a tubular ceramic condenser having another form of terminal connection; Fig. 3 is a section on line 3—3 of Fig. 2; Fig. 4 is an enlarged section of one end of the Fig. 1 condenser, and Fig. 5 is a diagrammatic view of the dipping operation for soldering the terminal connections.

In Fig. 1 is shown a typical tubular condenser having a dielectric 1 of ceramic or the like and inner and outer metallized coatings 2 and 3 which usually are of silver bonded to the dielectric by a ceramic flux or bonding agent. The capacity of the condenser is determined by the overlapping areas of the electrodes in the region 4 intermediate the ends of the dielectrics. From the region of the overlapping electrode areas the electrodes extend in opposite directions. The extension 5 for the outer electrode 3 may terminate at the end of the dielectric as shown in Fig. 1, or it may have as shown in Fig. 2 a further extension 6 along the end walls of the dielectric and even a further extension 7 along the inner walls of the dielectric. The extension 8 of the inner electrode 2 has a portion 9 along the end walls of the dielectric and a portion 10 along the outer walls of the dielectric. In any event the electrode extensions terminate short of the overlapping electrode sections so that there is no electrical contact short circuiting the overlapping electrode sections. Customarily the condenser is enclosed within a case of insulating material having outlines indicated as dotted lines at 11. The foregoing is, or may be, of typical construction.

Extending centrally from each end of the bore of the dielectric 1 are lead wires 12 and 13 (Fig. 2). It is convenient to have these lead wires central so that the condenser may be rotated about the lead wire extensions to apply identifying color striping to the enclosing case 11. It is also more convenient to mold the case if the lead wires extend centrally. The lead wire 12 has an angular extension or offset 14 within one end of the bore. Since the lead wire 12 is intended to make electrical connection to the outer electrode 3, the extension 14 is spaced from the inner electrode 2. If the lead wire 12 were arranged at the opposite end of the dielectric, it would make contact with the extension 8 of the inner electrode 2. In any event, the angular extension 14 would be so positioned that it would be short of the overlapping section 4 of the electrodes. The length of the angular extension 14 is slightly greater than the inner diameter of the bore of the dielectric so that when a force is exerted on the terminal lead, for example, at point 15, the angular extension 14 is wedged across the bore.

Figure 5:
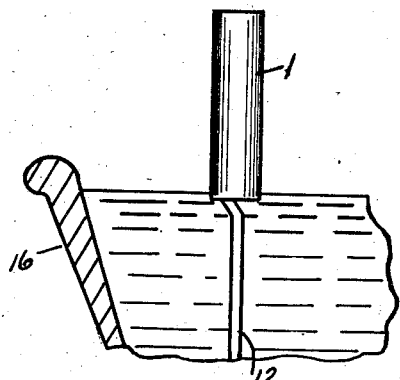

The manner of making the electrical connection is illustrated in Fig. 5. The dielectric with the lead 12 depending therefrom and with the extension 14 wedged across the bore by a force suitably applied at point 15 is dipped in a solder pot 16, taking care that the liquid level does not rise to the overlapping section 4 of the electrodes. Ordinarily the liquid level will immerse at least part of the angular extension 14 and will overlap the outer end extension 5 of the electrode 3. Upon lifting the dielectric from the solder pot, very little solder will be found to have adhered to the lead wire 12, but a diaphragm 17 of solder will bridge the space between the angular extension 14 and the bore of the dielectric 1 and will also overlap the end of the electrode extension 5. This diaphragm of solder makes the electrical connection to the terminal lead 12 and also to the extension 5 of the electrode 3. The connection to the electrode extension 5 is a compression connection caused by thermal shrinkage of the solder. This is advantageous since it does not tend to lift the electrode clear of the dielectric.

At the opposite end of the dielectric 1 (Fig. 1) the terminal lead 13 has an offset 18 which contacts the inner electrode extension 8. If the lead 13 were used at the opposite end of the dielectric to make contact with the outer electrode 3, it would contact the inner bore of the dielectric. Having the offset 18 makes it easier to locate the lead centrally. The electrical connection is made in the same manner as the electrical connection to the lead 12, suitable means being provided to hold the lead in place during the dipping. At the completion of the dipping operation a diaphragm 19 of solder makes a compression connection to the electrode extension 10 and bridges the space between the offset section 18 of the lead wire and the inner bore of the dielectric.

In Fig. 2 is shown another form of terminal lead wire having a central extension 20 projecting from the bore of the dielectric 1 and reverse bent or offset sections 21 extending within the bore of the dielectric short of the overlapping section 4 of the electrodes 2 and 3. By having two or more reverse bent sections 21, there can be three or more points of contact with the bore of the dielectric so that the lead is self-centering. Although the lead is preferably made of dead soft copper, there can be sufficient friction grip so that the electrode will hold itself in place during the dipping operation. The soldering is made by dipping in the same manner as the other terminal constructions and after the lead is lifted from the solder pot there will be a diaphragm 22 of solder making a compression connection to the outside of the electrode extension 5 and bridging the space between the reverse bent sections 21 of the lead wire and the inner bore of the dielectric. In the particular construction illustrated in Fig. 2 the reverse bent sections are shown making contact with the electrode extensions 7. This is not necessary. The reverse bent sections 21 might make contact with the inner surface of the dielectric in the same manner as the angular extension 14 on the lead wire 12.

It is obvious that the lead 20, 21 could be used for making connection to the inner electrode 2 (Fig. 1). When so used the reverse bent sections 21 would engage the electrode extension 8 and the lead would be dipped into solder to a point somewhere along the electrode extension 10 but short of the overlapping sections 4 of the electrodes.

In all of the terminal constructions the electrical connection is made by immersing the lead wire and one end of the dielectric to a depth short of the overlapping section 4 of the electrodes. The solder, due to surface tension, bridges the space between the terminal lead and the electrode extension to which it is to be connected and thereby both electrically and mechanically anchors the terminal lead. The solder connection to the terminal extension includes a compression connection which is electrically and mechanically more desirable since the contraction of the solder does not tend to lift the metalized electrode coating away from the dielectric. Also in all of the terminal lead constructions there is a central lead wire extension which is desirable, not only in the subsequent manufacturing operations, but in the use of the condenser. In all of the constructions the lead wires are located within the bore of the dielectric so that the overall diameter of the finished condenser is less.

What I claim as new is:
1. In a tubular dielectric having a metalized coating on one of the inner and outer surfaces thereof and overlying the outer end wall of one end of the tube, a terminal lead having a section outside the tube and another section offset out of line from the first section and projecting within and extending diametrically across the bore of the tube at said one end, the space between the crosswise extending offset section and the inner surface of the bore being small enough to hold fluid solder by surface tension, and a diaphragm of solder closing the bore and bridging the space between the offset crosswise extending section of the lead at said one end and shrunk over the metalized coating overlying said one end.

2. In a tubular dielectric having a metalized coating on one of the inner and outer surfaces thereof, a terminal lead having a section outside the tube and another section offset out of line from the first section and projecting within and extending diametrically across the bore of the tube at one end, the space between the offset crosswise extending section and the inner surface of the bore being small enough to hold fluid solder by surface tension, and a diaphragm of solder closing the bore and bridging the space between the offset crosswise extending section of the lead at said one end.

3. In a tubular dielectric having a metalized coating on one of the inner and outer surfaces thereof and on one end surface, a terminal lead having a section outside the tube and another section offset out of line from the first section and projecting within and extending diametrically across the bore of the tube at said one end, the space between the offset crosswise extending section and the inner surface of the bore being small enough to hold fluid solder by surface tension, and a diaphragm of solder closing the bore and bridging the space between the offset crosswise extending section of the lead at said one end.

4. In a tubular dielectric having a metalized coating on one of the inner and outer surfaces thereof, a terminal lead having a section at said one end of the tube outside the tube and another section offset out of line from the first section and projecting within and extending crosswise of the bore of the tube in a direction to intersect the inner peripheral wall of the tube at angularly spaced points, the space between the offset crosswise extending section and the inner surface of the bore being small enough to hold fluid solder by surface tension, and a diaphragm of solder closing the bore and bridging the space between the offset crosswise extending section of the lead at said one end.

BYRON B. MINNIUM.

References Cited in the file of this patent
UNITED STATES PATENTS

| Number | Name | Date |
|---|---|---|
| 1,835,582 | Allen | Dec. 8, 1931 |
| 1,936,404 | Miner | Nov. 21, 1933 |
| 2,129,008 | Kater | Sept. 6, 1938 |
| 2,455,136 | Obert | Nov. 30, 1948 |
| 2,457,599 | Pessel | Dec. 28, 1948 |

FOREIGN PATENTS

| Number | Country | Date |
|---|---|---|
| 440,951 | Great Britain | Jan. 6, 1936 |
| 583,493 | Great Britain | Dec. 19, 1946 |